US012811421B2

(12) United States Patent
Toby

(10) Patent No.: US 12,811,421 B2
(45) Date of Patent: Nov. 24, 2026

(54) ELECTRONIC DEVICE CHARGING STATION ASSEMBLY

(71) Applicant: William Toby, Phoenix, AZ (US)

(72) Inventor: William Toby, Phoenix, AZ (US)

( * ) Notice: Subject to any disclaimer, the term of this patent is extended or adjusted under 35 U.S.C. 154(b) by 713 days.

(21) Appl. No.: 18/226,564

(22) Filed: Jul. 26, 2023

(65) Prior Publication Data

US 2025/0038551 A1 Jan. 30, 2025

(51) Int. Cl.

*H02J 7/70* (2026.01)
*H02J 7/34* (2006.01)
*H02J 50/10* (2016.01)

(52) U.S. Cl.

CPC .............. *H02J 7/731* (2026.01); *H02J 7/342* (2020.01); *H02J 50/10* (2016.02)

(58) Field of Classification Search

None

See application file for complete search history.

(56) References Cited

U.S. PATENT DOCUMENTS

D709,858 S 7/2014 Kim
9,955,784 B1 5/2018 Smith
10,056,766 B2 8/2018 Smeja
2008/0170355 A1 7/2008 Kyriakides
2008/0203968 A1 8/2008 Campbell
2010/0176762 A1* 7/2010 Daymude ............... H02J 7/731 320/110
2015/0263547 A1* 9/2015 Browne .................. H02J 7/731 211/26
2015/0326053 A1 11/2015 Amano
2019/0289740 A1* 9/2019 Roberts ................ A47B 96/027

FOREIGN PATENT DOCUMENTS

WO WO2015105908 7/2015

* cited by examiner

*Primary Examiner* — Kristy A Haupt

(57) ABSTRACT

An electronic device charging station assembly for charging cellular phones includes a housing, which is attached to and which extends axially from a base plate. The housing is polygonal prism shaped and has a handle attached to its top. A supply battery is attached to and positioned in the housing. Each holding element of a plurality of holding elements is attached to one of the base plate and the housing and defines a respective charging position. The holding element retains an electronic device within the respective charging position. Each charging element of a plurality of charging elements is attached to one of the base plate and the housing, is operationally engaged to the supply battery, and can operationally engage an internal battery of an electronic device. The charging elements thus can charge the internal batteries of a set of electronic devices that is retained in the charging positions.

11 Claims, 6 Drawing Sheets

ELECTRONIC DEVICE CHARGING STATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to charging stations and more particularly pertains to a new charging station for charging cellular phones. A charging station having a plurality of connecting options for electrically coupling electronic devices to be charged and a handle allowing for repositioning would be advantageous.

(2) Description of Related Art Including Information Disclosed Under 37 CFR 1.97 and 1.98

The prior art relates to charging stations which typically do not provide a variety of connecting options to engage electronic devices for charging and which do no physically attach to the electronic devices so that the charging station and attached electronic devices can be moved as one.

BRIEF SUMMARY OF THE INVENTION

An embodiment of the disclosure meets the needs presented above by generally comprising a housing, which is attached to and which extends axially from a base plate. The housing is polygonal prism shaped. A handle is attached to a top of the housing. A supply battery is attached to the housing and is positioned in an interior space that is defined by the housing. Each holding element of a plurality of holding elements is attached to one of the base plate and the housing and defines a respective charging position. The holding element is configured to retain an electronic device within the respective charging position. Each charging element of a plurality of charging elements is attached to one of the base plate and the housing. The charging element is operationally engaged to the supply battery and is configured to operationally engage an internal battery of an electronic device. The plurality of charging elements thus is configured to charge the internal batteries of a set of electronic devices that is retained in the charging positions by the retaining elements.

Another embodiment of the disclosure includes an electronic device charging system, which comprises an electronic device charging station assembly, as per the disclosure above, and a set of electronic devices. Each electronic device has an internal battery and is held within a respective charging position by a respective the holding element. Each charging element is operationally engaged to the internal battery of a respective electronic device so that the internal battery is charged.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
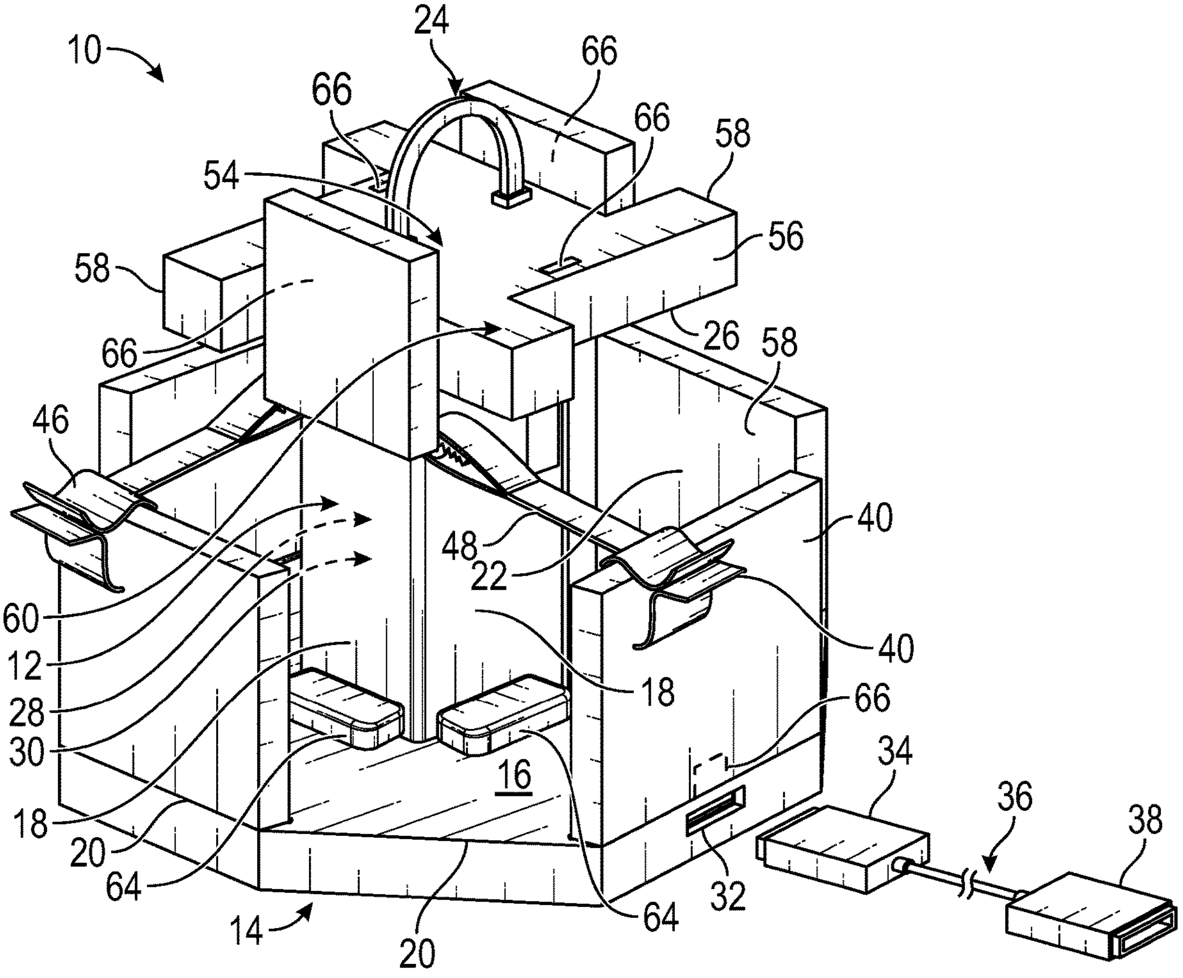
FIG. 1 is an isometric perspective view of an electronic device charging station assembly according to an embodiment of the disclosure.

With reference now to the drawings, and in particular to FIGS. 1 through 6 thereof, a new charging station embodying the principles and concepts of an embodiment of the disclosure and generally designated by the reference numeral 10 will be described.

As best illustrated in FIGS. 1 through 6, the electronic device charging station assembly 10 generally comprises a housing 12, which is attached to and which extends axially from a base plate 14. The housing 12 is polygonal prism shaped. An upper facet 16 of the base plate 14 is even numbered polygonal shaped. The housing 12 has a plurality of faces 18, with each face 18 being perpendicular to the upper facet 16. The plurality of faces 18 is numbered one half that of edges 20 of the upper facet 16. As is shown in FIG. 1, the upper facet 16 is octagonal and has eight edges 20. The housing 12 thus is cuboid and has four faces 18, with the electronic device charging station assembly 10 being designed to hold four electronic devices 22, as will become apparent below. The present invention also anticipates the upper facet 16 being hexagonal, decagonal, or the like. A handle 24 is attached to a top 26 of the housing 12 and is used to transport the electronic device charging station assembly 10.

A supply battery 28, which is rechargeable, is attached to the housing 12 and is positioned in an interior space 30 that is defined by the housing 12. A charging port 32 is attached to the housing 12 and is operationally engaged to the supply battery 28. The charging port 32 is configured for insertion of a first plug 34 of a charging cord 36. A second plug 38 of the charging cord 36 is configured to engage an electrical circuit to charge the supply battery 28.

Each holding element 40 of a plurality of holding elements 40 is attached to one of the base plate 14 and the housing 12 and defines a respective charging position 42. The holding element 40 is configured to retain an electronic device 22 within the respective charging position 42. Each holding element 40 may comprise a retaining plate 44 and a retention element 46. The retaining plate 44 is hingedly attached to and extends from the upper facet 16 proximate to a respective edge 20 of the upper facet 16. The retaining plates 44 are alternately positioned along the edges 20 of the upper facet 16. The retention element 46 is operationally engaged to the retaining plate 44 and is configured to retain the retaining plate 44 in a hinged configuration. The retaining plate 44 is configured to retain an electronic device 22 within a respective charging position 42 and substantially parallel to a respective face 18 of the housing 12.

Figure 3:
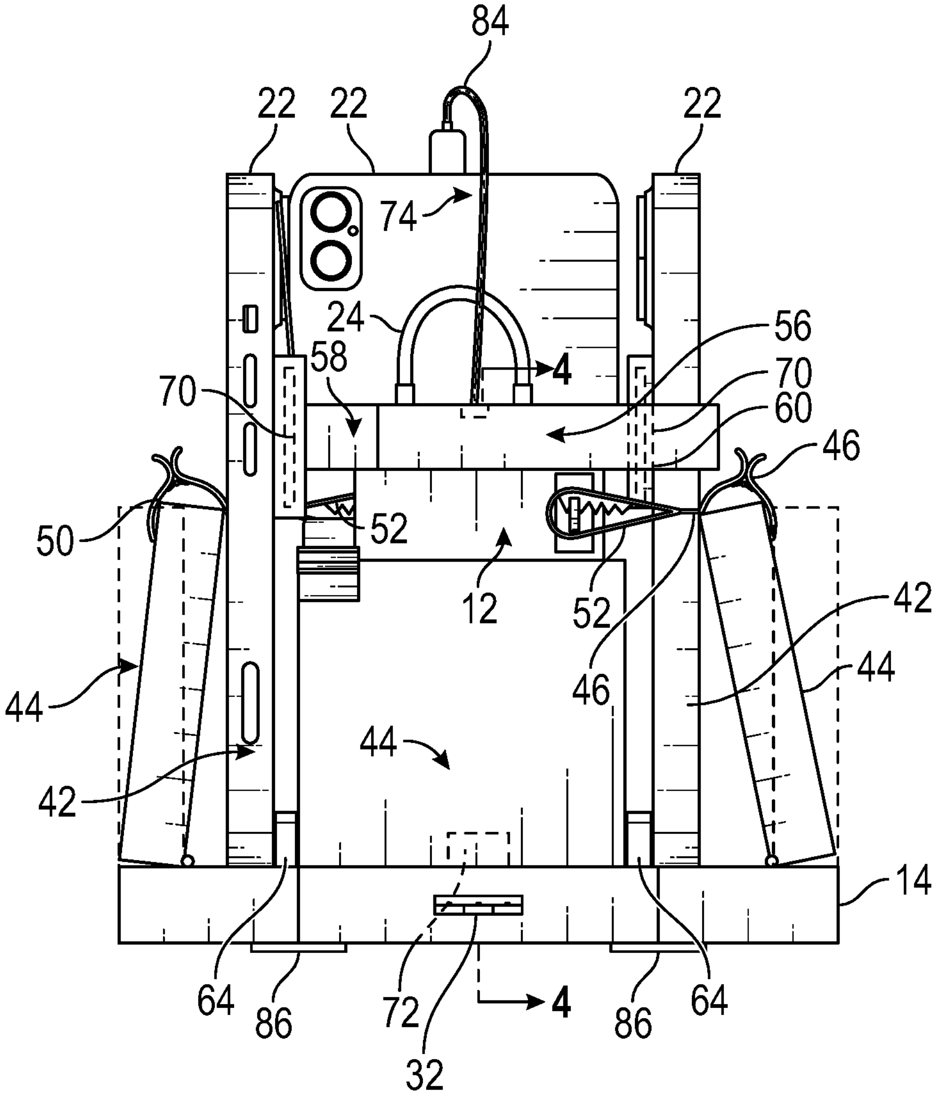
FIG. 3 is a side view of an embodiment of the disclosure.
Figure 4:
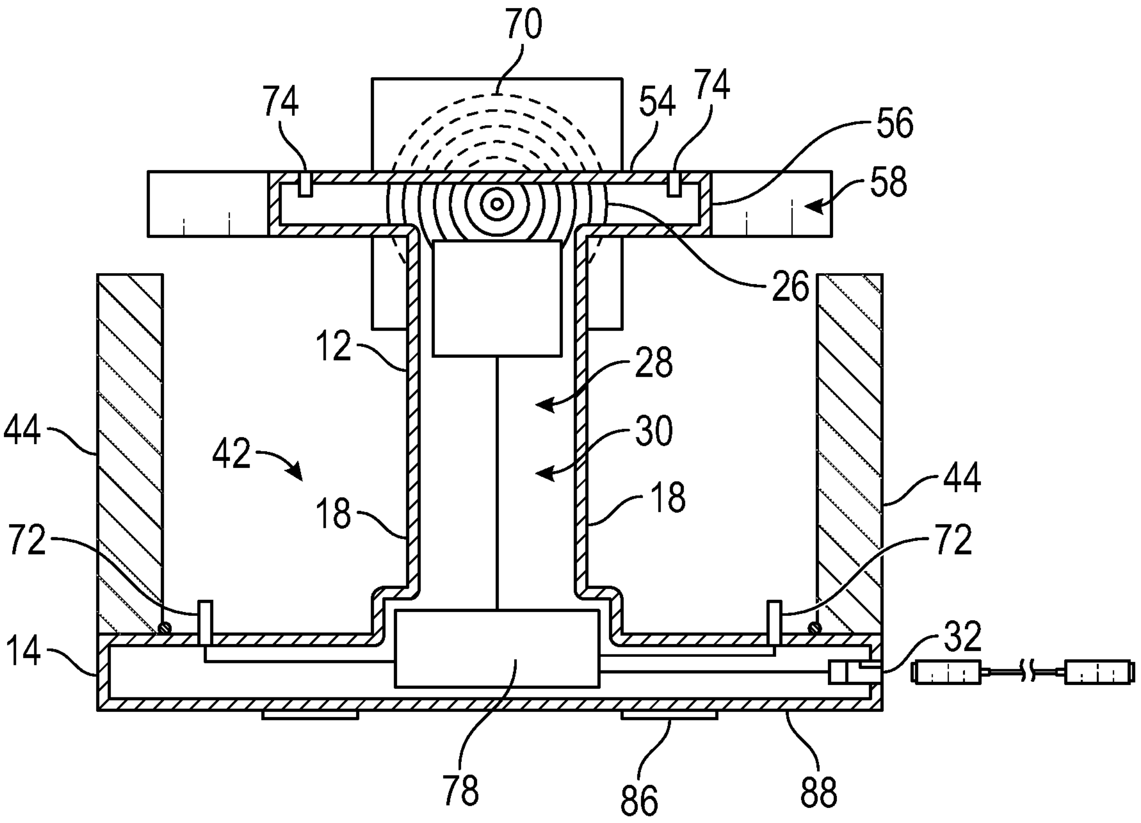
FIG. 4 is a cross-sectional view of an embodiment of the disclosure.
Figure 5:
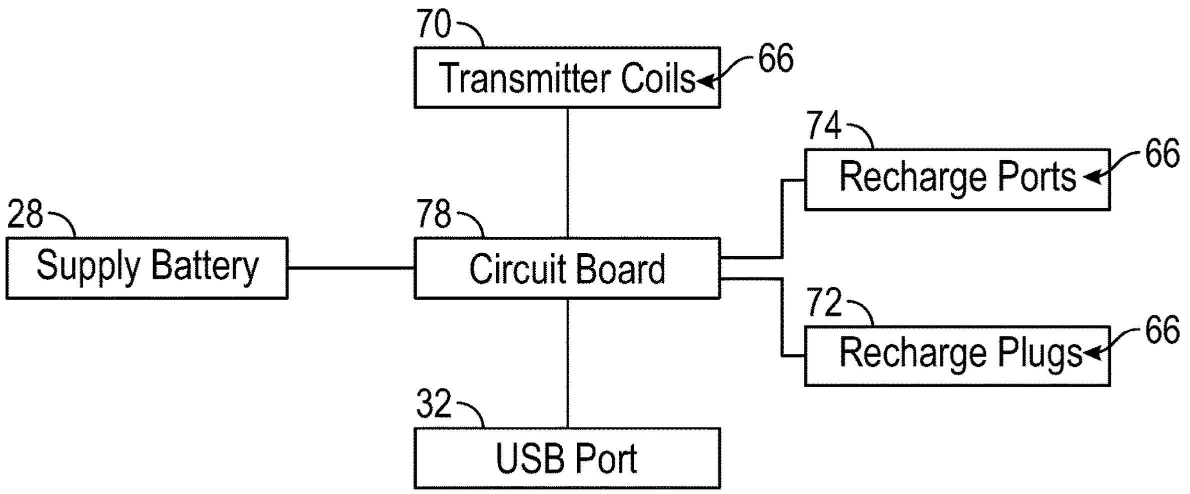
FIG. 5 is a block diagram of an embodiment of the disclosure.
Figure 6:
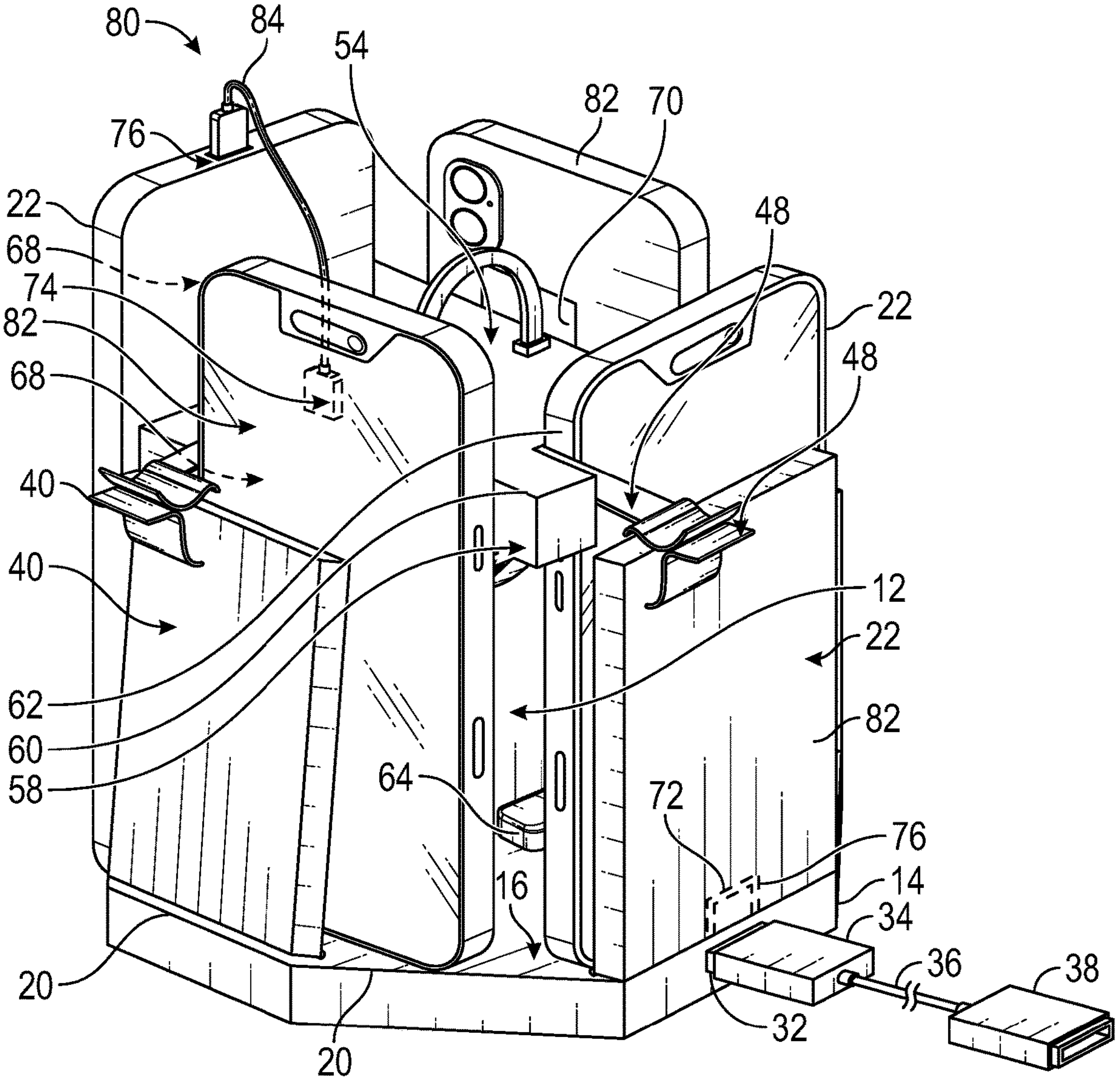
FIG. 6 is an in-use view of an embodiment of the disclosure.

The retention element 46 may comprise a strap 48, which is attached to and which extends from the housing 12, and a clip 50, which is attached to the strap 48 distal from the housing 12. The clip 50 is positioned to be selectively attached to the retaining plate 44 to hold the retaining plate 44 in the hinged configuration. The strap 48 may be fixedly attached to the housing 12, or, as is shown in FIG. 3, the strap 48 may be removably attachable to the housing 12 by means of an alligator clip 52, thereby enabling a user to selectively position the strap 48 relative to the housing 12 and the electronic device 22. The present invention also anticipates the strap 48 comprising elastic. Additionally, the retention element 46 may comprise other retention means, such as, but not limited to, springs attached to and extending between the retaining plate 44 and the housing 12, spring-loaded hinges biasing the retaining plate 44 to the hinged configuration, or the like.

A cap plate 54 is attached to and extends radially from the top 26 of the housing 12. The cap plate 54 has sides 56 equivalent in number to the faces 18 of the housing 12. Each bar 58 of a plurality of bars 58 is attached to a respective side 56 and extends coplanarly from the cap plate 54. Each corner 60 of the cap plate 54 thus is fitted with a respective bar 58, which is configured to abut a sidewall 62 of an electronic device 22 that is positioned in a respective charging position 42. Each spacer 64 of a plurality of spacers 64 is attached to the upper facet 16 of the base plate 14 and abuts a respective face 18 of the housing 12. The spacer 64 is configured to stabilize an electronic device 22 substantially parallel to the respective face 18.

Each charging element 66 of a plurality of charging elements 66 is attached to one of the base plate 14 and the housing 12. The charging element 66 is operationally engaged to the supply battery 28 and is configured to operationally engage an internal battery 68 of an electronic device 22. The plurality of charging elements 66 thus is configured to charge the internal batteries 68 of a set of electronic devices 22 that is retained in the charging positions 42 by the holding elements 40.

Each charging element 66 comprises a wireless charger 70, a recharger plug 72, or a recharger port 74. The wireless charger 70 is attached to the housing 12 proximate to the top 26 of the housing 12 and is configured to wirelessly charge the internal battery 68 of an electronic device 22. The recharger plug 72 is attached to and extends perpendicularly from the upper facet 16 of the base plate 14 and is configured for insertion into an integral port 76 of an electronic device 22 to charge the internal battery 68 of the electronic device 22. The recharger port 74 is attached to the top 26 of the housing 12 or, as is shown in FIG. 1, to the cap plate 54. The recharger port 74 is configured to operationally engage a charger cord 86 of an electronic device 22 to charge the internal battery 68 of the electronic device 22. The present invention anticipates the charging elements 66 and the supply battery 28 being operationally engaged to a circuit board 78 that is programmed to control charging of the supply battery 66 and the internal batteries 68.

Figure 2:
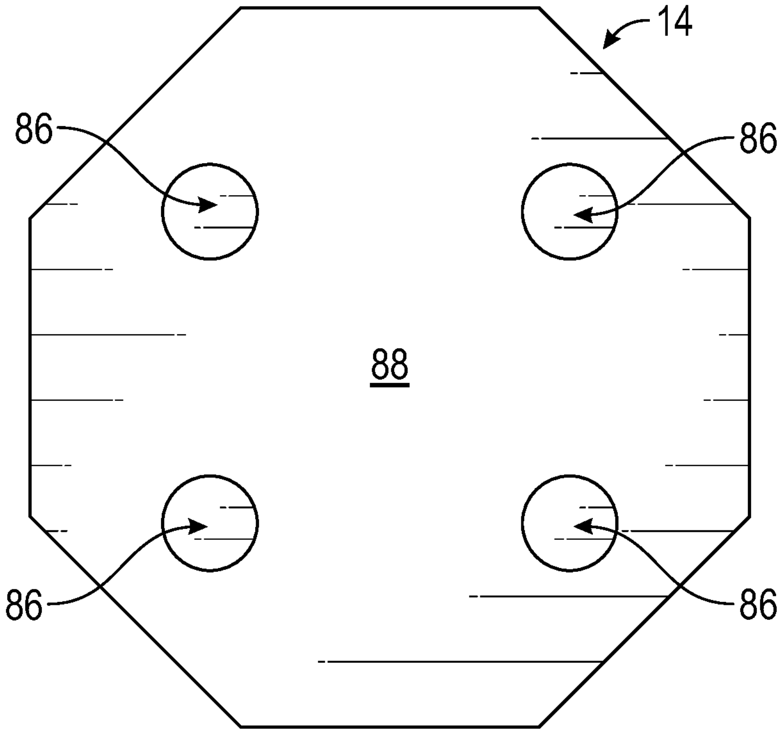
FIG. 2 is a bottom view of an embodiment of the disclosure.

The base plate 12 also may have a plurality of feet 86 attached to its lower facet 88, as is shown in FIG. 2. The feet 86 would comprise rubber, silicone, or the like, and thus be resiliently compressible, thereby providing for frictional coupling of the base plate 12 to a surface to deter slippage of the electronic device charging station assembly 10 upon the surface.

The present invention also includes an electronic device charging system 80, which comprises an electronic device charging station assembly 10, as per the specification above, and a set of electronic devices 22. Each electronic device 22 has an internal battery 68 and is held within a respective charging position 42 by a respective holding element 40. Each charging element 66 is operationally engaged to the internal battery 68 of a respective electronic device 22 so that the internal battery 68 is charged. The electronic device 22 typically would comprise a cellular phone 82 but also could comprise other handheld electronic devices, such as tablet computers, or the like.

In use, each charging position 42 is available for insertion of a respective electronic device 22, which then is held in place with a holding element 40. When charging of the internal battery 68 is to be performed without the charger cord 86 of the electronic device 22, the integral port 76 can be attached to the recharger plug 72. If charging using the charger cord 86, the integral port 76 is positioned upwardly and the charger cord 86 is attached to the integral port 76 and a respective recharger port 74. For electronic devices 22 that are configured to be wirelessly charged, charging can be accomplished using the wireless charger 70. Should a user need to reposition or transport the electronic device charging station assembly 10, the handle 24 can be grasped to lift the electronic device charging station assembly 10 and any attached electronic devices 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic device charging station assembly comprising:

a base plate, an upper facet of the base plate being even numbered polygonal shaped;

a housing attached to and extending axially from the base plate, the housing being polygonal prism shaped, the housing having a plurality of faces, each face being perpendicular to the upper facet, the plurality of faces being numbered one half that of the edges of the upper facet;

a handle attached to a top of the housing;

a supply battery attached to the housing and positioned in an interior space defined by the housing;

a plurality of holding elements, each holding element of the plurality of holding elements being attached to one of the base plate and the housing and defining a respective charging position, the holding element being configured to retain an electronic device within the respective charging position; and a plurality of charging elements, each charging element of the plurality of charging elements being attached to one of the base plate and the housing, the charging element being operationally engaged to the supply battery and being configured to operationally engage an internal battery of an electronic device, wherein the plurality of charging elements is configured to charge the internal batteries of a set of electronic devices retained in the charging positions by the plurality of holding elements.

2. The electronic device charging station assembly of claim 1, wherein:

the upper facet is octagonal and has eight edges; and the housing is cuboid and has four faces.

3. The electronic device charging station assembly of claim 1, further including:

the supply battery being rechargeable; and a charging port attached to the housing and operationally engaged to the supply battery, such that the charging port is configured for insertion of a first plug of a charging cord, wherein a second plug of the charging cord is configured to engage an electrical circuit to charge the supply battery.

4. The electronic device charging station assembly of claim 1, wherein each holding element comprises:

a retaining plate being hingedly attached to and extending from the upper facet proximate to a respective edge of the upper facet, such that the retaining plates are alternately positioned along the edges of the upper facet; and a retention element being operationally engaged to the retaining plate and being configured to retain the retaining plate in a hinged configuration, wherein the retaining plate is configured to retain an electronic device within a respective charging position and substantially parallel to a respective face of the housing.

5. The electronic device charging station assembly of claim 4, wherein the retention element comprises:

a strap being attached to and extending from the housing; and a clip being attached to the strap distal from the housing, such that the clip is positioned to be selectively attached to the retaining plate to hold the retaining plate in the hinged configuration.

6. The electronic device charging station assembly of claim 1, further including:

a cap plate attached to and extending radially from the top of the housing, the cap plate having sides equivalent in number to the faces of the housing; and a plurality of bars, each bar being attached to a respective side and extending coplanarly from the cap plate, such that each corner of the cap plate is fitted with a respective bar, wherein the respective bar is configured to abut a sidewall of an electronic device positioned in a respective charging position.

7. The electronic device charging station assembly of claim 1, further including a plurality of spacers, each spacer of the plurality of spacers being attached to the upper facet of the base plate and abutting a respective face of the housing, wherein the spacer is configured to stabilize an electronic device substantially parallel to the respective face.

8. The electronic device charging station assembly of claim 1, wherein each charging element of the plurality of charging elements comprises:

a wireless charger attached to the housing proximate to the top of the housing and being configured to wirelessly charge the internal battery of an electronic device;

a recharger plug attached to and extending perpendicularly from the upper facet of the base plate and being configured for insertion into an integral part of an electronic device to charge the internal battery of the electronic device; or a recharger port attached to the top of the housing and being configured to operationally engage a charger cord of an electronic device to charge the internal battery of the electronic device.

9. An electronic device charging station assembly comprising:

a base plate, and upper facet of the base plate being octagonal;

a housing attached to and extending axially from the base plate, the housing being cuboid and having four faces, each face being perpendicular to the upper facet;

a handle attached to a top of the housing;

a supply battery attached to the housing and positioned in an interior space defined by the housing, the supply battery being rechargeable;

a charging port attached to the housing and operationally engaged to the supply battery, such that the charging port is configured for insertion of a first plug of a charging cord, wherein a second plug of the charging cord is configured to engage an electrical circuit to charge the supply battery;

a plurality of holding elements, each holding element of the plurality of holding elements being attached to one of the base plate and the housing and defining a respective charging position, the holding element being configured to retain an electronic device within the respective charging position, each holding element comprising:

a retaining plate being hingedly attached to and extending from the upper facet proximate to a respective edge of the upper facet, such that the retaining plates are alternately positioned along the edges of the upper facet; and a retention element being operationally engaged to the retaining plate and being configured to retain the retaining plate in a hinged configuration, wherein the retaining plate is configured to retain an electronic device within a respective charging position and substantially parallel to a respective face of the housing, the retention element comprising:

a strap being attached to and extending from the housing; and a clip being attached to the strap distal from the housing, such that the clip is positioned to be selectively attached to the retaining plate to hold the retaining plate in the hinged configuration;

a cap plate attached to and extending radially from the top of the housing, the cap plate having sides equivalent in number to the faces of the housing;

a plurality of bars, each bar being attached to a respective side and extending coplanarly from the cap plate, such that each corner of the cap plate is fitted with a respective bar, wherein the respective bar is configured to abut a sidewall of an electronic device positioned in a respective charging position;

a plurality of spacers, each spacer of the plurality of spacers being attached to the upper facet of the base plate and abutting a respective face of the housing, wherein the spacer is configured to stabilize an electronic device substantially parallel to the respective face; and a plurality of charging elements, each charging element of the plurality of charging elements being attached to one of the base plate and the housing, the charging element being operationally engaged to the supply battery and being configured to operationally engage an internal battery of an electronic device, wherein the plurality of charging elements is configured to charge the internal batteries of a set of electronic devices retained in the charging positions by the plurality of holding elements, each charging element of the plurality of charging elements comprising:

a wireless charger attached to the housing proximate to the top of the housing and being configured to wirelessly charge the internal battery of an electronic device;

a recharger plug attached to and extending perpendicularly from the upper facet of the base plate and being configured for insertion into an integral port of an electronic device to charge the internal battery of the electronic device; or a recharger port attached to the top of the housing and being configured to operationally engage a charger cord of an electronic device to charge the internal battery of the electronic device.

10. An electronic device charging system comprising:

a base plate, an upper facet of the base plate being even numbered polygonal shaped;

a housing attached to and extending axially from the base plate, the housing being polygonal prism shaped, the housing having a plurality of faces, each face being perpendicular to the upper facet, the plurality of faces being numbered one half that of the edges of the upper facet;

a handle attached to a top of the housing;

a supply battery attached to the housing and positioned in an interior space defined by the housing;

a plurality of holding elements, each holding element of the plurality of holding elements being attached to one of the base plate and the housing and defining a respective charging position;

a set of electronic devices, each electronic device of the set of electronic devices having an internal battery and being held within a respective charging position by a respective the holding element; and a plurality of charging elements, each charging element of the plurality of charging elements being attached to one of the base plate and the housing, the charging element being operationally engaged to the supply battery and to the internal battery of a respective electronic device, such that the internal battery is charged.

11. The electronic device charging system of claim 10, wherein the electronic device comprises a cellular phone.

* * * * *